(12) United States Patent
Parikh et al.

(10) Patent No.: US 12,338,755 B2
(45) Date of Patent: Jun. 24, 2025

(54) COMPRESSED GAS ASSISTED INERTIAL IMPACTOR WITH ELASTOMERIC NOZZLES

(71) Applicant: CUMMINS FILTRATION INC., Nashville, TN (US)

(72) Inventors: Chirag D. Parikh, Madison, WI (US); Bradley A. Smith, Columbus, IN (US); Bryan P. Steffen, Oregon, WI (US); Mahsa Kasiri, Fitchburg, WI (US)

(73) Assignee: CUMMINS FILTRATION INC., Nashville, TN (US)

( * ) Notice: Subject to any disclaimer, the term of this patent is extended or adjusted under 35 U.S.C. 154(b) by 0 days.

(21) Appl. No.: 18/760,644

(22) Filed: Jul. 1, 2024

(65) Prior Publication Data

US 2024/0352879 A1    Oct. 24, 2024

Related U.S. Application Data

(60) Division of application No. 18/602,706, filed on Mar. 12, 2024, now Pat. No. 12,129,775, which is a
(Continued)

(51) Int. Cl.
*F01M 13/02*   (2006.01)
*F01M 13/04*   (2006.01)

(52) U.S. Cl.
CPC ... *F01M 13/022* (2013.01); *F01M 2013/0433* (2013.01); *F01M 2013/0438* (2013.01)

(58) Field of Classification Search
CPC .......... F01M 13/04; F01M 2013/0433; F01M 2013/0438; F01M 13/00; F01M 13/022;
(Continued)

(56) References Cited

U.S. PATENT DOCUMENTS 2,281,254 A   4/1942 Anthony, Jr.
4,986,838 A   1/1991 Johnsgard
(Continued)

FOREIGN PATENT DOCUMENTS

CN   102251827 B   3/2013
CN   205013096 U   2/2016
(Continued)

OTHER PUBLICATIONS

First Office Action issued for Chinese Patent Application No. 202280061209.1 issued Jul. 4, 2024, 8 pages.
(Continued)

*Primary Examiner* — George C Jin
*Assistant Examiner* — Teuta B Holbrook
(74) *Attorney, Agent, or Firm* — Foley & Lardner LLP

(57) ABSTRACT

A gas-liquid separator comprises a housing comprising a first inlet structured to receive a blowby gas stream, the blowby gas stream having a first flow velocity, and a second inlet structured to a communicate a compressed gas into the housing, at least a portion of the second inlet disposed within the first inlet. An elastomeric nozzle is coupled to the first inlet and positioned around the second inlet, the elastomeric nozzle structured to combine the blowby gas stream with the compressed gas such that the compressed gas causes the blowby gas stream to flow at a second flow velocity that is greater than the first flow velocity. An impaction plate is disposed downstream of the elastomeric nozzle such that the blowby gas stream impacts the impaction plate and separates liquid and aerosol contained in the blowby gas stream.

8 Claims, 12 Drawing Sheets

Related U.S. Application Data continuation of application No. PCT/US2022/043229, filed on Sep. 12, 2022.

(60) Provisional application No. 63/278,936, filed on Nov. 12, 2021, provisional application No. 63/243,536, filed on Sep. 13, 2021.

(58) Field of Classification Search
CPC . F01M 13/028; F01M 2013/027; F01M 11/08
USPC ............... 123/41.86, 196 A; 55/DIG. 19
See application file for complete search history.

(56) References Cited

U.S. PATENT DOCUMENTS

| | | | |
|---|---|---|---|
| 5,487,371 | A | 1/1996 | Beckman et al. |
| 5,803,025 | A | 9/1998 | Feucht |
| 6,478,019 | B2 | 11/2002 | Fedorowicz et al. |
| 7,288,202 | B2 | 10/2007 | Maier |
| 7,857,883 | B2 | 12/2010 | Scheckel et al. |
| 8,181,634 | B2 | 5/2012 | Spix et al. |
| 8,915,237 | B2 | 12/2014 | Copley et al. |
| 9,932,869 | B2 | 4/2018 | An et al. |
| 9,988,957 | B2 | 6/2018 | Erdmann et al. |
| 10,001,040 | B2 | 6/2018 | Copley et al. |
| 10,092,869 | B2 | 10/2018 | Mincher |
| 10,550,743 | B2 | 2/2020 | Coolens et al. |
| 10,794,245 | B2 | 10/2020 | Fischer et al. |
| 10,982,575 | B2 | 4/2021 | Herter et al. |
| 11,149,601 | B2 | 10/2021 | Brinker et al. |
| 2006/0096933 | A1 | 5/2006 | Maier |
| 2016/0032798 | A1 | 2/2016 | Herman et al. |
| 2016/0138442 | A1 | 5/2016 | An et al. |
| 2020/0398287 | A1 | 12/2020 | Mincher et al. |
| 2020/0408118 | A1 | 12/2020 | Mincher et al. |

FOREIGN PATENT DOCUMENTS

| | | | | |
|---|---|---|---|---|
| CN | 206830350 | U | | 1/2018 |
| CN | 108661833 | A | | 10/2018 |
| CN | 208236478 | U | | 12/2018 |
| CN | 109415959 | A | | 3/2019 |
| CN | 208587206 | U | | 3/2019 |
| CN | 106232954 | B | | 6/2019 |
| CN | 209586465 | U | * | 11/2019 |
| CN | 110566359 | A | | 12/2019 |
| CN | 209942905 | U | | 1/2020 |
| CN | 108392898 | B | | 4/2020 |
| CN | 111315466 | A | | 6/2020 |
| CN | 210768977 | U | | 6/2020 |
| CN | 111425278 | | | 7/2020 |
| CN | 210977631 | U | | 7/2020 |
| CN | 211314317 | U | | 8/2020 |
| CN | 216518208 | U | | 5/2022 |
| EP | 1 275 828 | B1 | | 1/2003 |
| EP | 3 523 514 | B1 | | 8/2019 |
| JP | 4407094 | B2 | | 11/2009 |
| JP | 2011-256761 | A | | 12/2011 |
| WO | WO-2009/037496 | A2 | | 3/2009 |
| WO | WO-2009051887 | A1 | * | 4/2009 ............ B01D 45/08 |
| WO | WO-2014/160870 | A1 | | 10/2014 |

OTHER PUBLICATIONS

Extended European Search Report issued for European Patent Application No. 22868178.9 issued Dec. 4, 2024.

First Office Action issued for Korean Patent Application No. 10-2024-7008063 issued Oct. 10, 2024.

International Search Report and Written Opinion issued for PCT Application No. PCT/US2022/043229 issued Feb. 28, 2023, 19 pages.

* cited by examiner

COMPRESSED GAS ASSISTED INERTIAL IMPACTOR WITH ELASTOMERIC NOZZLES

CROSS REFERENCE TO RELATED PATENT APPLICATIONS

The present application is a divisional of U.S. patent application Ser. No. 18/602,706, filed Mar. 12, 2024, which is a continuation of PCT Application No. PCT/US2022/043229, filed Sep. 12, 2022, which claims the benefit of and priority to U.S. Provisional Patent Application No. 63/243,536, filed Sep. 13, 2021, and U.S. Provisional Patent Application No. 63/278,936, filed Nov. 12, 2021. The contents of these applications are incorporated herein by reference.

TECHNICAL FIELD

The present disclosure relates generally to inertial impactors for use in crankcase ventilation systems.

BACKGROUND

During operation of an internal combustion engine, a fraction of combustion gases can flow out of the combustion cylinder and into the crankcase of the engine. These gases are often referred to as "blowby" gases. The blowby gases include a mixture of aerosols, oils, and air. If vented directly to the ambient, the aerosols contained in the blowby gases can potentially harm the environment. Accordingly, the blowby gases are often routed out of the crankcase via a crankcase ventilation system. The crankcase ventilation system may pass the blowby gases through a coalescer (i.e., a coalescing filter element) to remove most or all of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

One type of separator uses inertial impaction air-oil separation for removing oil particles from the crankcase blowby gas (or aerosol) by accelerating the blowby gas stream to high velocities through nozzles or orifices and directing same against an impactor, causing a sharp directional change effecting the oil separation. Another type of separator uses coalescence in a coalescing filter for removing oil droplets. In other arrangements, the separator may rotate to increase the filter efficiency of the coalescing filter elements by rotating the filter media during filtering.

SUMMARY

Embodiments described herein relate generally to gas-liquid separators that include an elastomeric nozzle and a compressed gas source to accelerate blowby gas flow towards an impaction plate to facilitate separation of liquids and aerosols form the blowby gas stream.

In a set of embodiments, a gas-liquid separator comprises a housing comprising a first inlet structured to receive a blowby gas stream, the blowby gas stream having a first flow velocity. The housing also comprises a second inlet structured to communicate a compressed gas into the housing, at least a portion of the second inlet disposed within the first inlet. An elastomeric nozzle is coupled to the first inlet and positioned around at least a portion of the second inlet, the elastomeric nozzle structured to combine the blowby gas stream with the compressed gas such that the compressed gas causes the blowby gas stream to flow at a second flow velocity greater than the first flow velocity. An impaction plate is disposed downstream of the elastomeric nozzle such that the blowby gas stream impacts the impaction plate and separates liquid and aerosol contained in the blowby gas stream.

In another set of embodiments, a gas-liquid separator comprises a housing comprising: an inlet structured to receive a blowby gas stream, the blowby gas stream having a first flow velocity. An elastomeric nozzle is coupled to the inlet and configured to communicate the blowby gas stream downstream of the elastomeric nozzle. An impaction plate is disposed downstream the elastomeric nozzle such that the blowby gas stream impacts the impaction plate and separates liquid and aerosol contained in the blowby gas stream resulting in cleaned blowby gas. An outlet assembly is coupled to an outlet of the housing. The outlet assembly comprises a first outlet assembly inlet structured to communicate a compressed gas into the outlet assembly, and a second outlet assembly inlet structured to receive the cleaned blowby gas from the housing. The compressed gas flowing through the outlet assembly creates suction at the second inlet and thereby, the outlet of the housing so as to accelerate the blowby gases to a second flow velocity greater than the first flow velocity as the blowby gases flow from the elastomeric nozzle towards the impaction plate.

In still another set of embodiments, a gas-liquid separator comprises: a housing comprising a flange extending from a portion of the housing. A baffle is coupled to the housing such that a first inlet is defined between the flange and a portion of the baffle. The first inlet is structured to receive a blowby gas stream that has a first flow velocity. The baffle comprises a second inlet structured to receive a compressed gas, and at least one outlet tube disposed opposite the second inlet and extending axially into the housing, the at least one outlet tube structured to communicate the compressed gas into the housing. At least one elastomeric nozzle is fluidly coupled to the first inlet and positioned around at least a portion of a corresponding outlet tube. The at least one elastomeric nozzle is structured to combine the blowby gas stream with the compressed gas such that the compressed gas causes the blowby gas stream to flow at a second flow velocity greater than the first flow velocity. An impaction plate is disposed downstream of the elastomeric nozzle such that the blowby gas stream impacts the impaction plate and separates liquid and aerosol contained in the blowby gas stream.

In yet another set of embodiments, a gas-liquid separator comprises a housing comprising a first inlet, a second inlet, and an elastomeric nozzle. The first inlet is structured to receive a blowby gas stream, the blowby gas stream having a first flow velocity. The second inlet is structured to communicate a compressed gas into the housing. The elastomeric nozzle is in series with the first inlet and the second inlet. The elastomeric nozzle is structured to combine the blowby gas stream with the compressed gas such that the compressed gas causes the blowby gas stream to flow at a second flow velocity greater than the first flow velocity. An impaction plate is disposed downstream of the elastomeric nozzle such that the blowby gas stream impacts the impaction plate and separates liquid and aerosol contained in the blowby gas stream.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
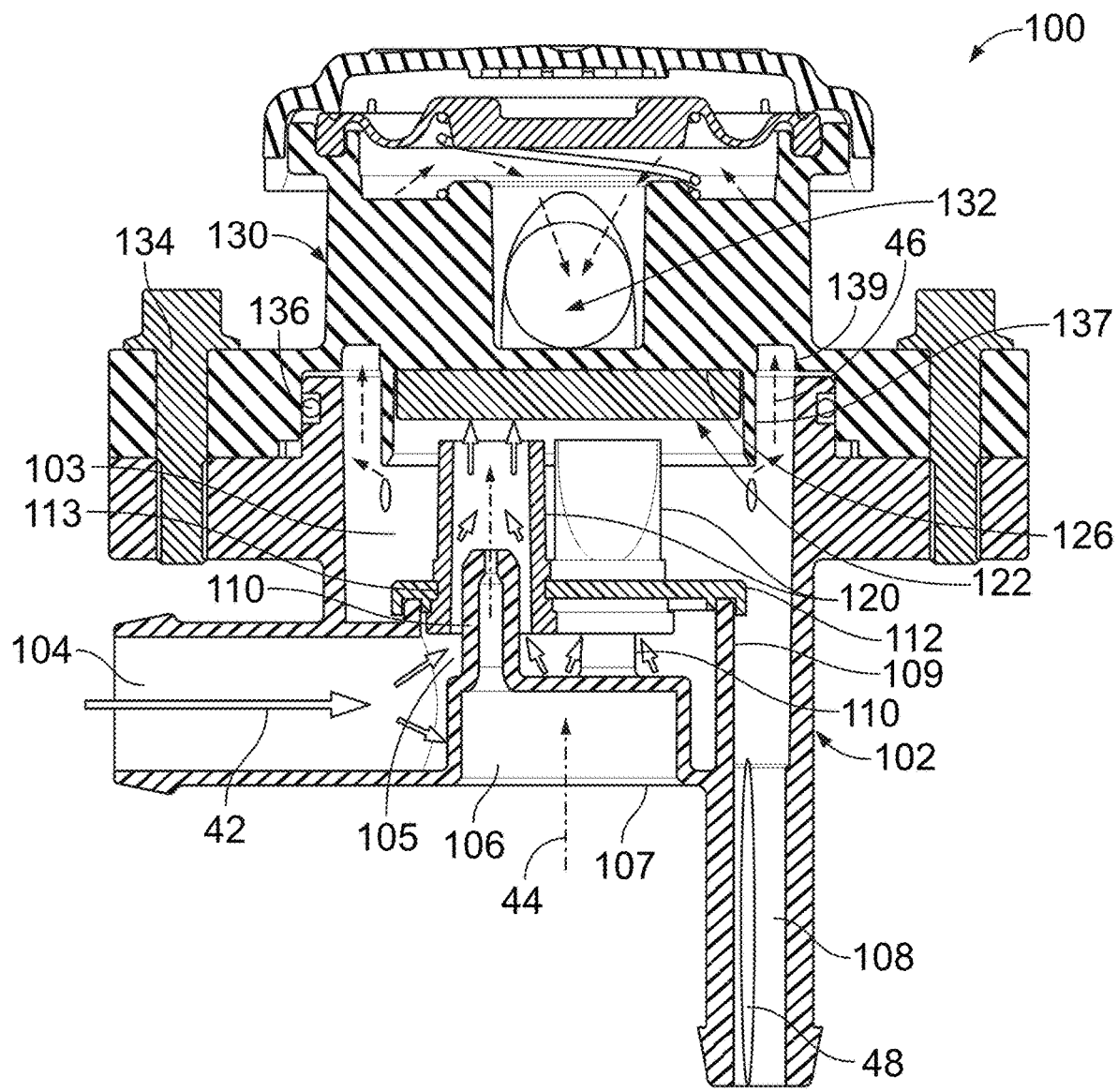
FIG. 1 is a side cross-sectional view of a gas-liquid separator, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to gas-liquid separators that include an elastomeric nozzle and a compressed gas source to accelerate blowby gas flow towards an impaction plate to facilitate separation of liquids and aerosols form the blowby gas stream.

Embodiments of the inertial impactor including an elastomeric nozzle and compressed gas source described herein may provide one or more benefits, including, for example: (1) increasing blowby gas stream flow velocity using a compressed gas source; (2) improving separation efficiency of aerosols and liquids from blowby gases in crankcase ventilation applications; and (3) providing a high velocity jet that creates a pumping effect which reduces crankcase pressure.

FIG. 1 is a side cross-sectional view of a gas-liquid separator 100, according to an embodiment. The gas-liquid separator 100 may be included in an open crankcase ventilation system or a closed crankcase ventilation system. The gas-liquid separator 100 comprises a housing 102 defining an internal volume or volume 103 and a cover 130. The cover 130 may be coupled to the housing 102 (e.g., via securing members 134 such as screws, nuts, bolts, rivets, etc.). A seal member 136 may be disposed between the housing 102 and the cover 130 so as to form a radial and/or axial seal therebetween.

The housing 102 comprises a first inlet 104 structure to receive an unfiltered blowby gas stream 42 (e.g., blowby air) and communicate the blowby gas stream 42 into the internal volume 103 of the housing 102. The blowby gas stream 42 has a first flow velocity. The first inlet 104 includes a body portion 109 that defines the flow path through the first inlet 104 and extends into the internal volume 103 of the housing 102.

The first inlet 104 further includes a mounting plate 112 that is positioned along and coupled to a downstream or outlet end of the body portion 109 of the first inlet 104 (i.e., between an internal area of the first inlet 104 and the internal volume 103 of the housing 102 along the fluid flow path of the blowby gas stream 42). The mounting plate 112 is configured to secure at least one elastomeric nozzle 120 (as described further herein) to the body portion 109 of the first inlet 104. In particular, the mounting plate 112 defines through-holes 113 that correspond to each of the elastomeric nozzles 120. As shown in FIG. 1, the elastomeric nozzles 120 each extend through one of the through-holes 113 to secure to the mounting plate 112, extending between an inner area of the first inlet 104 and the internal volume 103 of the housing 102. The outlet tubes 110 of the second inlet 106 (as described further herein) may optionally extend at least partially through the through-holes 113 (thus allowing the mounting plate 112 to extend around a portion of the second inlet 106).

The housing 102 also comprises a second inlet 106, that may be disposed at a non-zero angle with respective the first inlet 104 (e.g., at an angle of about 90 degrees with respect to the first inlet 104). The blowby gas stream 42 flows into the housing 102 (via the first inlet 104) at a different angle than the compressed gas 44 flowing into the housing 102 (via the second inlet 106). The second inlet 106 is structured to receive a pressurized or compressed gas 44 (e.g., pressurized or compressed air) and communicate the compressed gas 44 into the internal volume 103 of the housing 102. At least a portion of the second inlet 106 is disposed within the first inlet 104. For example, a portion of the first inlet 104 may circumferentially surround the second inlet 106 such that a radial gap 105 is present between the portion of the first inlet 104 and the outer surface of the second inlet 106. The blowby gases 42 can flow within the radial gap 105.

The second inlet 106 may include a second inlet entry portion 107 and one or more outlet tubes 110 extending (and downstream) from the entry portion 107. The compressed gas 44 flows into the second inlet 106 through the entry portion 107. The entry portion 107 receives the compressed gas 44 and directs the compressed gas 44 into the at least one outlet tube 110. The compressed gas 44 then flows out from (or is expelled from) within the second inlet 106 through the outlet tubes 110, into the elastomeric nozzle 120 to combine with the blowby gas stream 42 within the elastomeric nozzle 120. The compressed gas 44 and the blowby gas stream 42 then flow together out from the elastomeric nozzle 120 into the internal volume 103 of the housing 102. The inner diameter or flow area of the outlet tubes 110 is smaller than (and downstream of) the inner diameter or flow area of the entry portion 107, where the flow area refers to the cross-sectional area taken along a plane approximately perpendicular to the flow path. The outlet tubes 110 thereby function as a motive jet and accelerate the compressed gas 44 into the elastomeric nozzle 120 (and subsequently into the internal volume 103 of the housing 102) to accelerate the blowby gas 42. While shown as including the outlet tubes 110, the second inlet 106 may include any other opening or structure to allow the compressed gas 44 to enter the internal volume 103.

The housing 102 further includes at least one elastomeric nozzle 120 that is in series with and downstream of the first inlet 104 and the second inlet 106 (where the first inlet 104 and the second inlet 106 have parallel flow). The elastomeric nozzle 120 is coupled to a downstream end (or outlet portion) of the first inlet 104 (i.e., to the mounting plate 112) and positioned around at least a portion of the second inlet 106 around the outlet tubes 110. The elastomeric nozzle 120 is configured to combine the blowby gas 42 and the compressed gas 44 and communicate the combination downstream of the first inlet 104, into the internal volume 103 of the housing 102. One elastomeric nozzle 120 can be disposed around a corresponding one of the outlet tubes 110. Optionally, an elastomeric nozzle 120 can be positioned around each of the outlet tubes 110. The elastomeric nozzle 120 may have a duck billed shape or a conical shape.

The elastomeric nozzle 120 is positioned along the fluid flow path (of both the blowby gas stream 42 and the compressed gas 44) between the first inlet 104 and the second inlet 106 (respectively) and the internal volume 103 of the housing 102. The elastomeric nozzle 120 may be mounted on or fluidly coupled to the mounting plate 112 of the first inlet 104 and positioned along the downstream end of the first inlet 104. Accordingly, the elastomeric nozzle 120 is disposed around a corresponding outlet tube 110 of the second inlet 106. The inner surface of the elastomeric nozzle 120 is radially spaced apart from the outer surface of the outlet tube 110 to form a radial gap is between the outer surface of the outlet tube 110 and the inner surface of the elastomeric nozzle 120 through which the blowby gas 42 can flow into and through the elastomeric nozzle 120.

The downstream end of the outlet tube 110 is positioned within the elastomeric nozzle 120 such that the compressed gas 44 is output from the second inlet 106 within the elastomeric nozzle 120. Accordingly, the elastomeric nozzle 120 is structured to receive both the blowby gas stream 42 and the compressed gas 44 and combine the blowby gas stream 42 with the compressed gas 44. Since the compressed gas 44 is flowing at a higher velocity than the blowby gas stream 42, the compressed gas 44 causes the blowby gas stream 42 to flow at a second flow velocity greater than the first flow velocity (i.e., the compressed gas 44 increases the flow velocity of the blowby gas 42). The compressed gas stream 44 also generates a pumping effect that reduces pressure drop throughout the gas-liquid separator 100.

As shown in FIG. 1, the cover 130 includes an impaction plate 126 that is disposed downstream of and over the elastomeric nozzle 120. Accordingly, the blowby gas stream 42 (which has been combined with the compressed gas 44) exiting from the elastomeric nozzle 120 impacts the impaction plate 126, which separates the blowby gas stream 42 into cleaned blowby gas 46 and separated liquid, oil, gas, and/or aerosol (referred to herein as separated fluid 48) that was previously contained in the blowby gas stream 42. The impaction plate 126 may be formed by a flat surface of the cover 130 that is disposed downstream of and over the elastomeric nozzle 120 (e.g., in a direct flow path of the blowby gas 42 and compressed gas 44 flow streams flowing from the elastomeric nozzle 120). The flat surface forming the impaction plate 126 (that the blowby gas stream 42 impacts) extends along a plane that is at an angle of about 90 degrees with respect to a direction of flow of the blowby gas 42 and compressed gas 44 flow streams flowing out from the elastomeric nozzle 120.

An impaction plate flange 137 extends from the outer peripheral edges of the impaction plate 126 (as a part of the cover 130) towards the housing 102 such that a cover inlet 139 of the cover 130 is formed between an inside surface of an outer wall of the cover 130 and a portion (i.e., the outside surface) of the impaction plate flange 137. The impaction plate flange 137 extends circumferentially around the impaction plate 126 and extends axially from the impaction plate 126 in a direction opposite the fluid flow direction of the blowby gas 42 from the elastomeric nozzle 120. The impaction plate flange 137 may extend into the interior volume 103 of the housing 102 when assembled.

In some embodiments, the gas-liquid separator 100 further includes a filter media 122 (e.g., a patch of filter media) disposed on the impaction plate 126 (between the outlet of the elastomeric nozzle 120 and the impaction plate 126 along the fluid flow path). The combined blowby gas 42 and compressed gas 44 stream impacts the filter media 122 such that the filter media 122 filters the blowby gas 42 prior to impacting the impaction plate 126.

As shown in FIG. 1, the blowby gases 42 accelerated by the compressed gas 44 impact the impaction plate 126, causing separation of fluid 48 from the blowby gas 42 and creating cleaned blowby gas 46. The separated fluid 48 collects in a base of the housing 102 (within the internal volume 103) and drains from the housing 102 via a drain 108 (e.g., an oil drain) defined in the base of the housing 102. The cleaned blowby gases 46 flow through the internal volume 103 of the housing 102, around the elastomeric nozzle 120, around the impaction plate flange 137, into and through the cover 130 (via the cover inlet 139), and through a cover outlet 132 (e.g., a gas outlet) that may be defined in the cover 130 in some embodiments, and out of the gas-liquid separator 100 (via the cover outlet 132).

Figure 2:
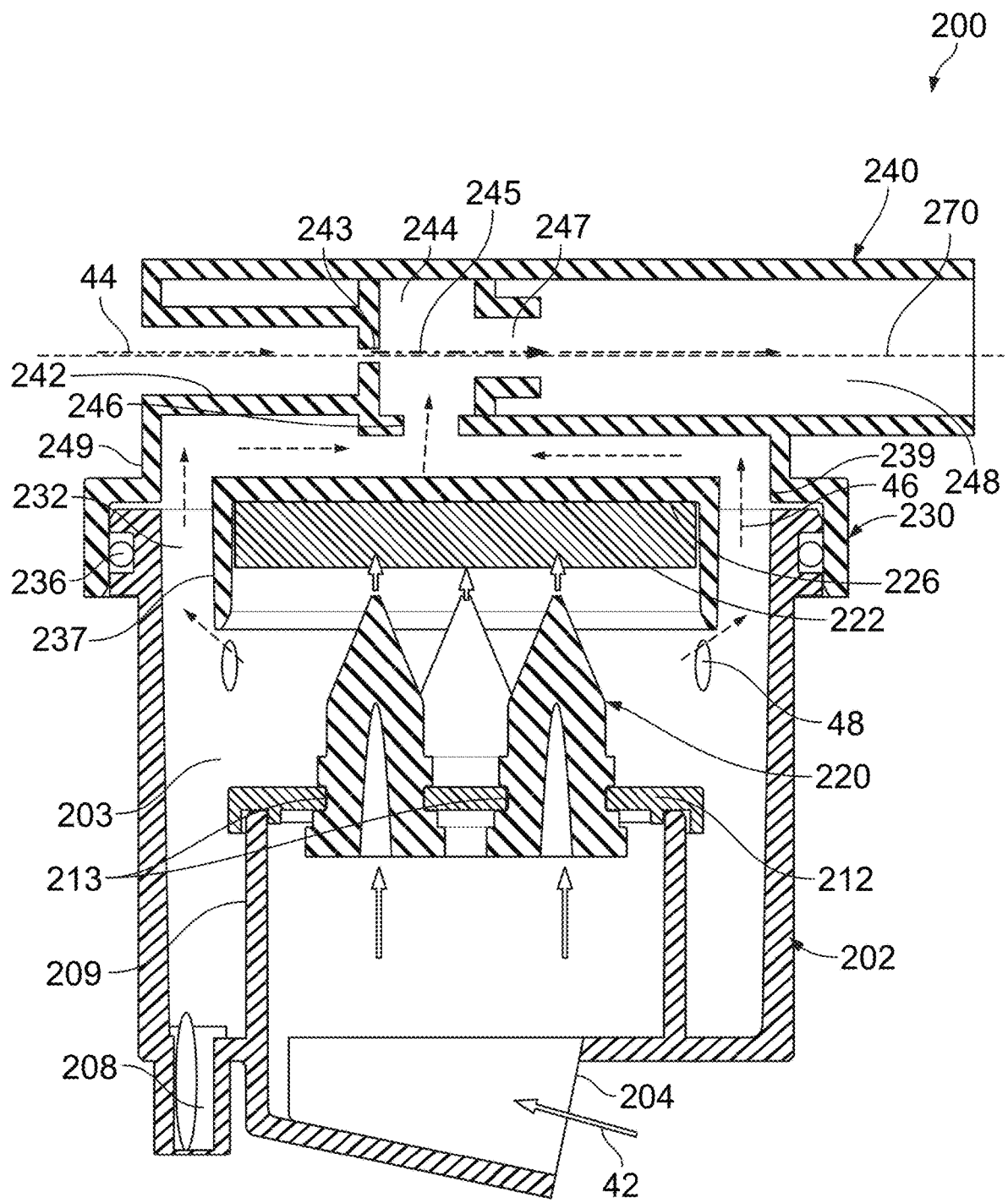
FIG. 2 is a side cross-sectional view of a gas-liquid separator, according to another embodiment.

FIG. 2 is a side cross-sectional view of a gas-liquid separator 200, according to another embodiment. The gas-liquid separator 200 may be included in an open crankcase ventilation system or a closed crankcase ventilation system. The gas-liquid separator 200 comprises a housing 202 defining an internal volume or area 203, a cover 230, and an outlet assembly 240. The cover 230 may be coupled to the housing 202 (e.g., via securing members such as screws, nuts, bolts, rivets, etc.). A seal member 236 may be disposed between the housing 202 and the cover 230 so as to form a radial and/or axial seal therebetween. The outlet assembly 240 is coupled to the housing 202 and/or the cover 230 and is positioned along the outlet 232 of the housing 202.

Optionally, the outlet assembly 240 may be constructed as a single unitary component with the cover 230.

The housing 202 comprises an inlet 204 structured to receive a blowby gas 42, for example, from a crankcase ventilation assembly and communicate the blowby gas 42 into the internal area 203 of the housing 202. The blowby gas 42 has a first flow velocity. The inlet 204 includes a body portion 209 that defines the flow path through the inlet 204 and extends into the internal area 203 of the housing 202.

The inlet 204 further includes a mounting plate 212 that is positioned along and coupled to a downstream or outlet end of the body portion 209 of the inlet 204 (i.e., between an internal area of the inlet 204 and the internal area 203 of the housing 202 along the fluid flow path of the blowby gas stream 42). The mounting plate 212 is configured to secure at least one elastomeric nozzle 220 (as described further herein) to the body portion 209 of the inlet 204. In particular, the mounting plate 212 defines through-holes 213 that correspond to each of the elastomeric nozzles 220. As shown in FIG. 2, the elastomeric nozzles 220 each extend through one of the through-holes 213 to secure to the mounting plate 212, extending between an inner area of the inlet 204 and the internal area 203 of the housing 202.

The housing 202 further includes at least one elastomeric nozzle 220 (e.g., a plurality of elastomeric nozzles 220) that is coupled to the inlet 204, for example, to a downstream end or outlet portion of the inlet 204, and configured to communicate the blowby gas 42 downstream of the inlet 204, into the internal area 203 of the housing 202. The elastomeric nozzle 220 is positioned along the fluid flow path of the blowby gas stream 42 and between the inlet 204 and the internal area 203 of the housing 202. The elastomeric nozzle 220 may have a duck billed shape or a conical shape. The elastomeric nozzles 220 are mounted on or coupled to the mounting plate 212 of the inlet 204 and positioned along the downstream end of the inlet 204.

As shown in FIG. 2, the cover 230 includes an impaction plate 226 that is disposed downstream of and over the elastomeric nozzle 220 such that the blowby gas stream 42 exiting the elastomeric nozzle 220 impacts the impaction plate 226, which separates the blowby gas stream 42 into the cleaned blowby gas 46 and the separated fluid 48 that was previously contained in the blowby gas stream 42. The impaction plate 226 may be formed by a flat surface of the cover 230 that is disposed downstream of and over the elastomeric nozzle 220 (e.g., in a direct flow path of the blowby gas stream 42 flowing from the elastomeric nozzle 220). The flat surface forming the impaction plate 226 (that the blowby gas stream 42 impacts) extends along a plane that is at an angle of about 90 degrees with respect to a direction of flow of the blowby gas stream 42 flowing from the elastomeric nozzle 220.

An impaction plate flange 237 extends from the outer peripheral edges of the impaction plate 226 (as a part of the cover 230) towards the housing 202 such that a cover inlet 239 of the cover 230 is formed between an inside surface of an outer wall of the cover 230 and a portion (i.e., the outside surface) of the impaction plate flange 237. The impaction plate flange 237 extends circumferentially around the impaction plate 226 and extends axially from the impaction plate 226 in a direction opposite the fluid flow direction of the blowby gas 42 from the elastomeric nozzle 220. The impaction plate flange 237 may extend into the interior area 203 of the housing 202 when assembled.

In some embodiments, the gas-liquid separator 200 further includes a filter media 222 (e.g., a patch of filter media) disposed on the impaction plate 226 (between the outlet of the elastomeric nozzle 220 and the impaction plate 226 along the fluid flow path). The blowby gas stream 42 impacts the filter media 222 such that the filter media 222 filters the blowby gas 42 prior to impacting the impaction plate 226.

As shown in FIG. 2, the blowby gases 42 accelerated by the compressed gas 44 impact the impaction plate 226, causing separation of fluid 48 from the blowby gas 42 and creating cleaned blowby gas 46. The separated fluid 48 collects in a base of the housing 202 (within the internal area 203) and drains from the housing 202 via a drain 208 (e.g., an oil drain) defined in the base of the housing 202. The cleaned blowby gas stream 46 flows through the internal area 203 of the housing 202, around the impaction plate 237, towards and through an outlet 232 defined in the housing 202, into and through the cover 230 (via the cover inlet 239), through the outlet assembly 240, and out of the gas-liquid separator 200 (via the outlet assembly outlet 248 of the outlet assembly 240).

The outlet assembly 240 comprises a first outlet assembly inlet 242 and a second outlet assembly inlet 249. The first outlet assembly inlet 242 is structured to receive and communicate a compressed gas 44 into the outlet assembly 240 and may be a channel defined through at least a portion of the outlet assembly 240. The second outlet assembly inlet 249 is structured to receive the cleaned blowby gas 46 from the housing 202 (and the cover 230) and communicate the cleaned blowby gas 46 into the outlet assembly 240.

The outlet assembly 240 defines a suction chamber 244 within which the compressed gas 44 and the cleaned blowby gas 46 are combined. The suction chamber 244 is structured to receive both of and combine the cleaned blowby gas 46 and the compressed gas 44. Accordingly, the outlet assembly 240 comprises a first suction chamber orifice or inlet 243, a second suction chamber orifice or inlet 246, and a suction chamber outlet 247. The outlet assembly 240 further comprises an outlet assembly outlet 248 (e.g., a gas outlet) through which the cleaned blowby gas 46 and the compressed gas 44 (that are combined together) exit the outlet assembly 240 (and the entire gas-liquid separator 200).

The first suction chamber inlet 243 receives the compressed gas 44 from the first outlet assembly inlet 242 and communicates the compressed gas 44 into the suction chamber 244. The second suction chamber inlet 246 receives the cleaned blowby gas 46 from the second outlet assembly inlet 249 and communicates the cleaned blowby gas 46 into the suction chamber 244. The cleaned blowby gas stream 46 then combines with the compressed gas stream 44 within the suction chamber 244, and the suction chamber outlet 247 subsequently communicates the cleaned blowby gas stream 46 (with the compressed gas stream 44) out from the suction chamber 244. The blowby gas stream 46 (with the compressed gas stream 44) then flows out of the outlet assembly 240 (via the outlet assembly outlet 248).

The inner diameter or flow area of the first suction chamber inlet 243 is smaller than (and downstream of) the inner diameter or flow area of the first outlet assembly inlet 242, where the flow area refers to the cross-sectional area taken along a plane approximately perpendicular to the flow path. The first suction chamber inlet 243 thereby creates a motive jet 245 and accelerates the compressed gas 44 into the suction chamber 244 (and subsequently into the outlet assembly outlet 248 of the housing 202) to accelerate the cleaned blowby gas 46 (and also the blowby gas 42). In particular, since the compressed gas 44 flows at a higher velocity than the cleaned blowby gas stream 46, the compressed gas 44 causes the cleaned blowby gas stream 46 and also the blowby gas 42 to flow at a second flow velocity greater than the first flow velocity (i.e., the compressed gas 44 increases the flow velocity of the cleaned blowby gas 46). The compressed gas 44 flowing through the outlet assembly 240 creates suction at the second suction chamber inlet 246 and thereby also at the outlet 232 of the housing 202 so as to accelerate the blowby gases 42 to a second flow velocity greater than the first flow velocity as the blowby gases 42 flow from the elastomeric nozzle 220 towards the impaction plate 226. Moreover, the compressed gas stream 44 also generates a pumping effect that reduces pressure drop throughout the gas-liquid separator 200.

The first outlet assembly inlet 242, the first suction chamber inlet 243, the suction chamber outlet 247, and the outlet assembly outlet 248 are all aligned with each other (in approximately a straight line) along an axis 270 of the fluid flow path. The second outlet assembly inlet 249 and the second suction chamber inlet 246 are not aligned with the axis 270. Instead, the second outlet assembly inlet 249 and the second suction chamber inlet 246 are positioned to the side of the axis 270 such that the cleaned blowby gas 46 flows into the suction chamber 244 at a non-zero angle (e.g., approximately) 90° to the axis 270. Therefore, the first suction chamber inlet 243 and the second suction chamber inlet 246 are disposed at a non-zero angle (e.g., at about 90°) relative to each other, and the cleaned blowby gas stream 46 flows into the suction chamber 244 at a different angle than the compressed gas 44 flowing into the suction chamber 244.

Figure 3:
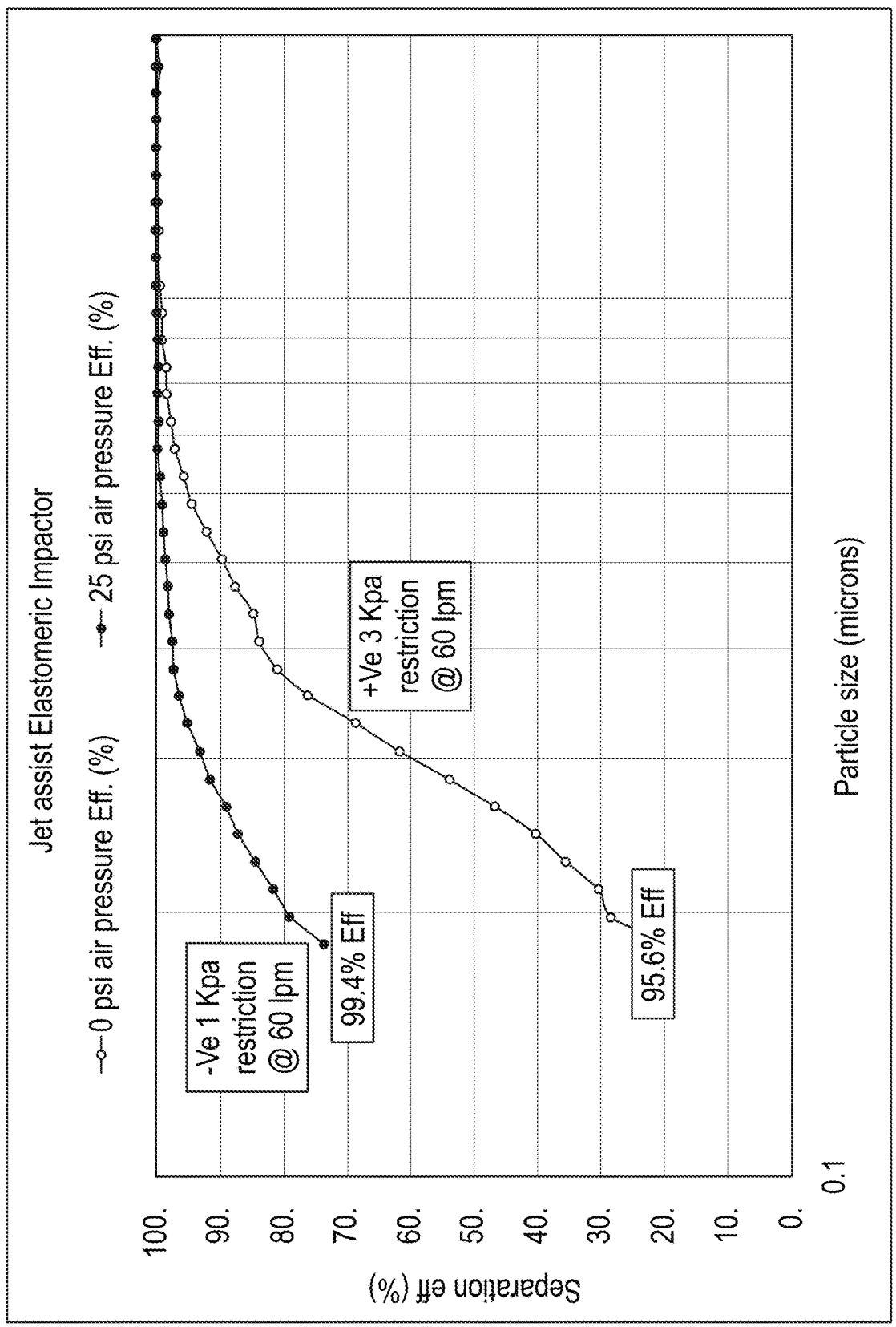
FIG. 3 is a plot of separation efficiency of the gas-liquid separator of FIG. 1 without compressed air flow (0 psi air pressure), and compressed gas provided into the housing at a pressure of 25 psi, for various particle sizes.
Figure 4A:
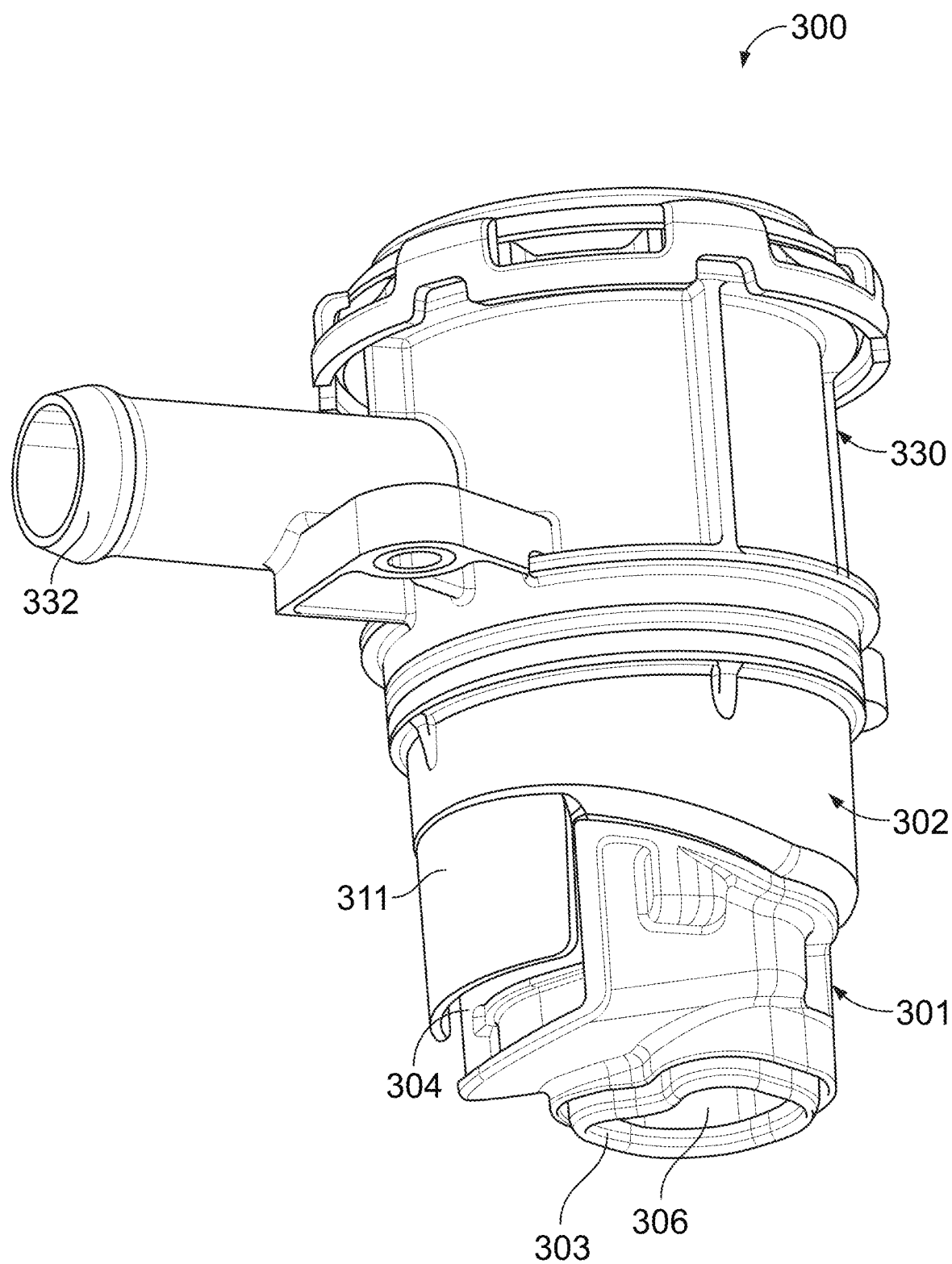
FIG. 4A is a perspective view of a gas-liquid separator, according to still another embodiment.
Figure 4B:
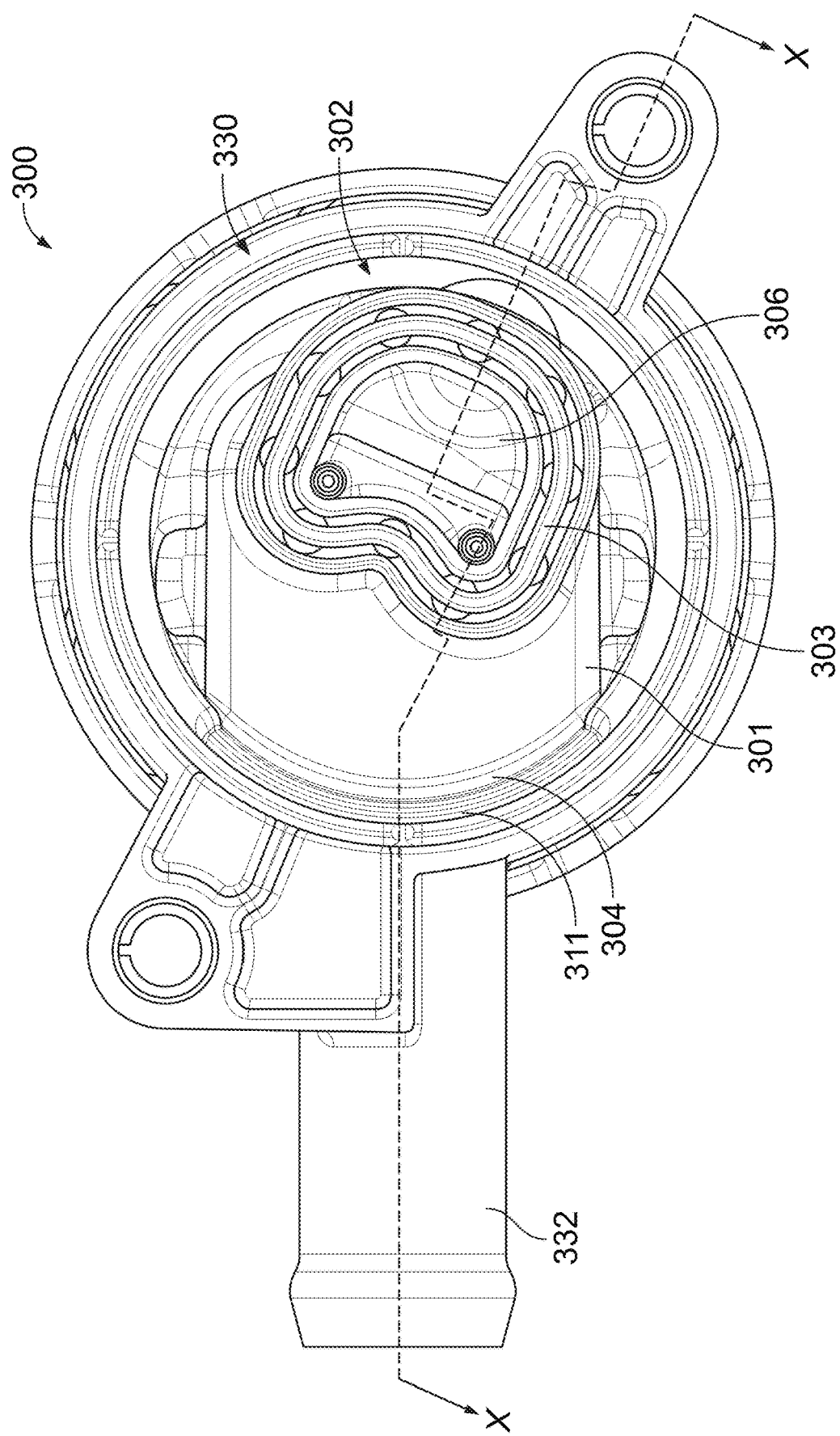
FIG. 4B is a bottom view of the gas-liquid separator of FIG. 4A
Figure 5:
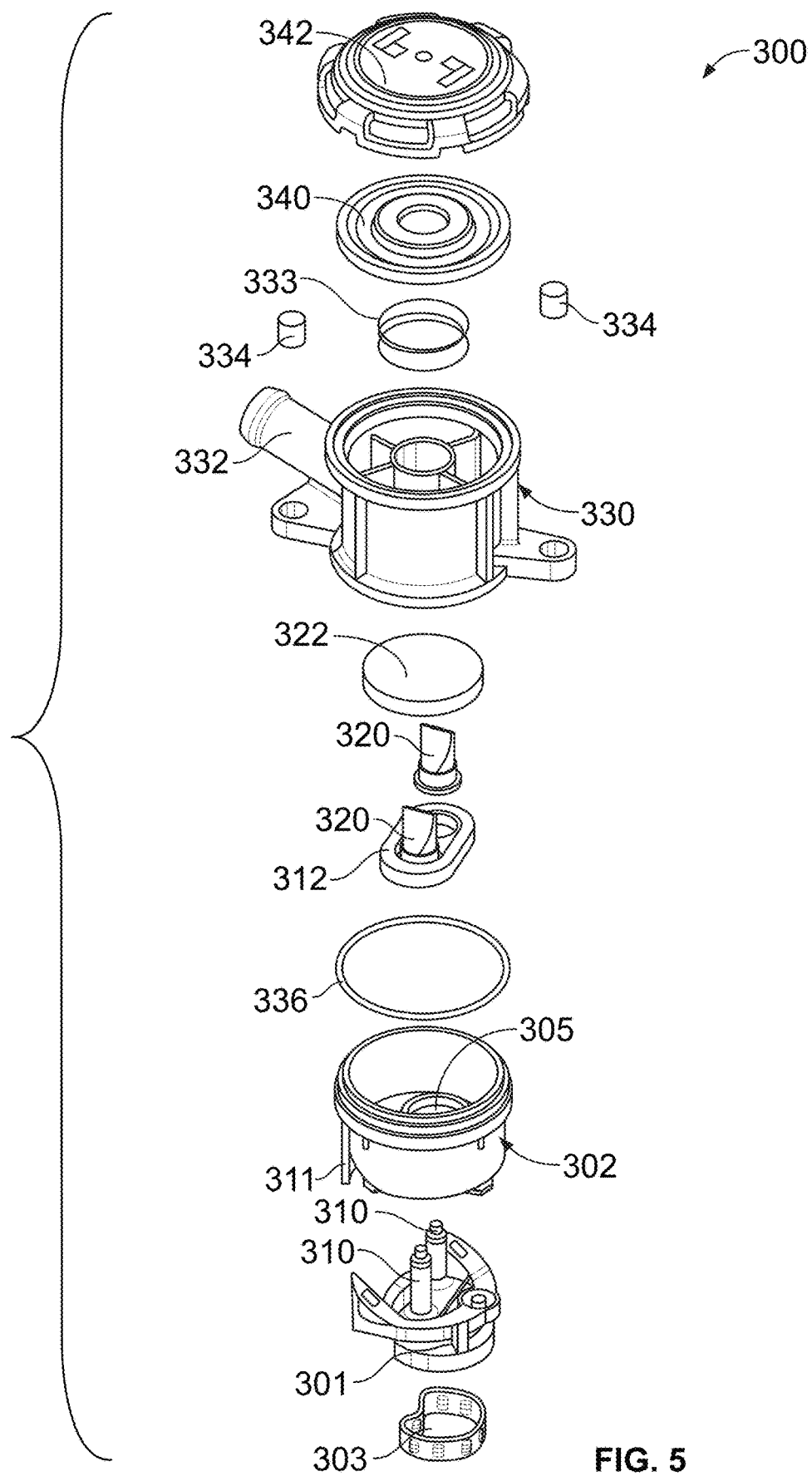
FIG. 5 is an exploded top view of the gas-liquid separator of FIG. 4A.
Figure 6:
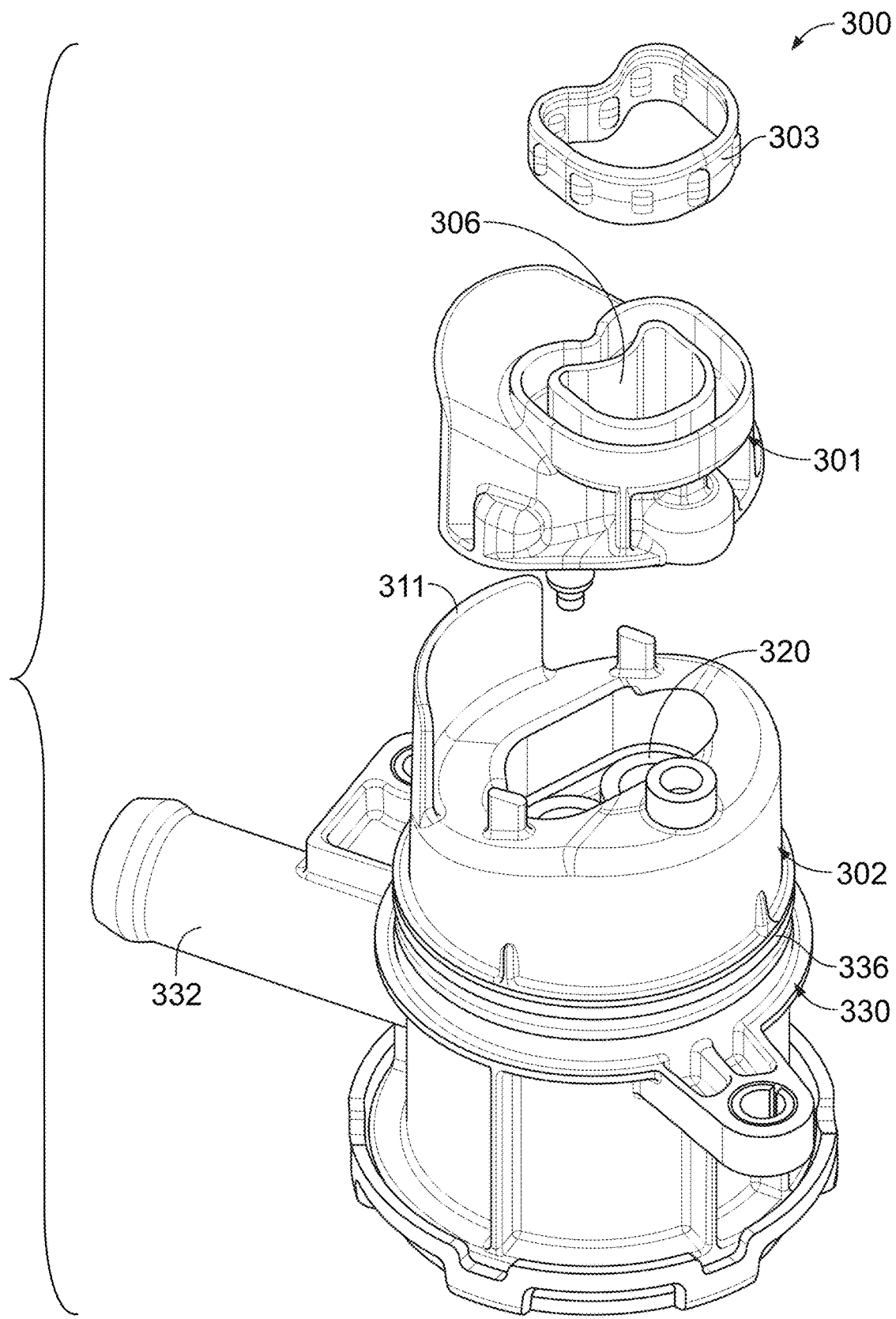
FIG. 6 is a partially exploded bottom view of the gas-liquid separator of FIG. 4A.

FIG. 3 is a plot of separation efficiency of the gas-liquid separator of FIG. 1 without compressed air flow 44 (0 psi air pressure), and compressed gas 44 provided into the housing 102 at a pressure of 25 psi, for various particle sizes. As shown in FIG. 3, the separation efficiency of the gas-liquid separator 100 increases from 95.6% to 99.4% for particles having a size of less than 0.5 microns, when a compressed gas source at a pressure of 25 psi is used to assist separation of the fluid 48 (e.g., oils and aerosols) from the blowby gases 42.

FIGS. 4A-7 are various views of a gas-liquid separator 300, according to another embodiment. The gas-liquid separator 300 may be included in an open crankcase ventilation system or a closed crankcase ventilation system. The gas-liquid separator 300 comprises a housing 302, a baffle 301, at least one elastomeric nozzle 320, a cover 330, a lid 342, and a diaphragm 340.

Figure 7:
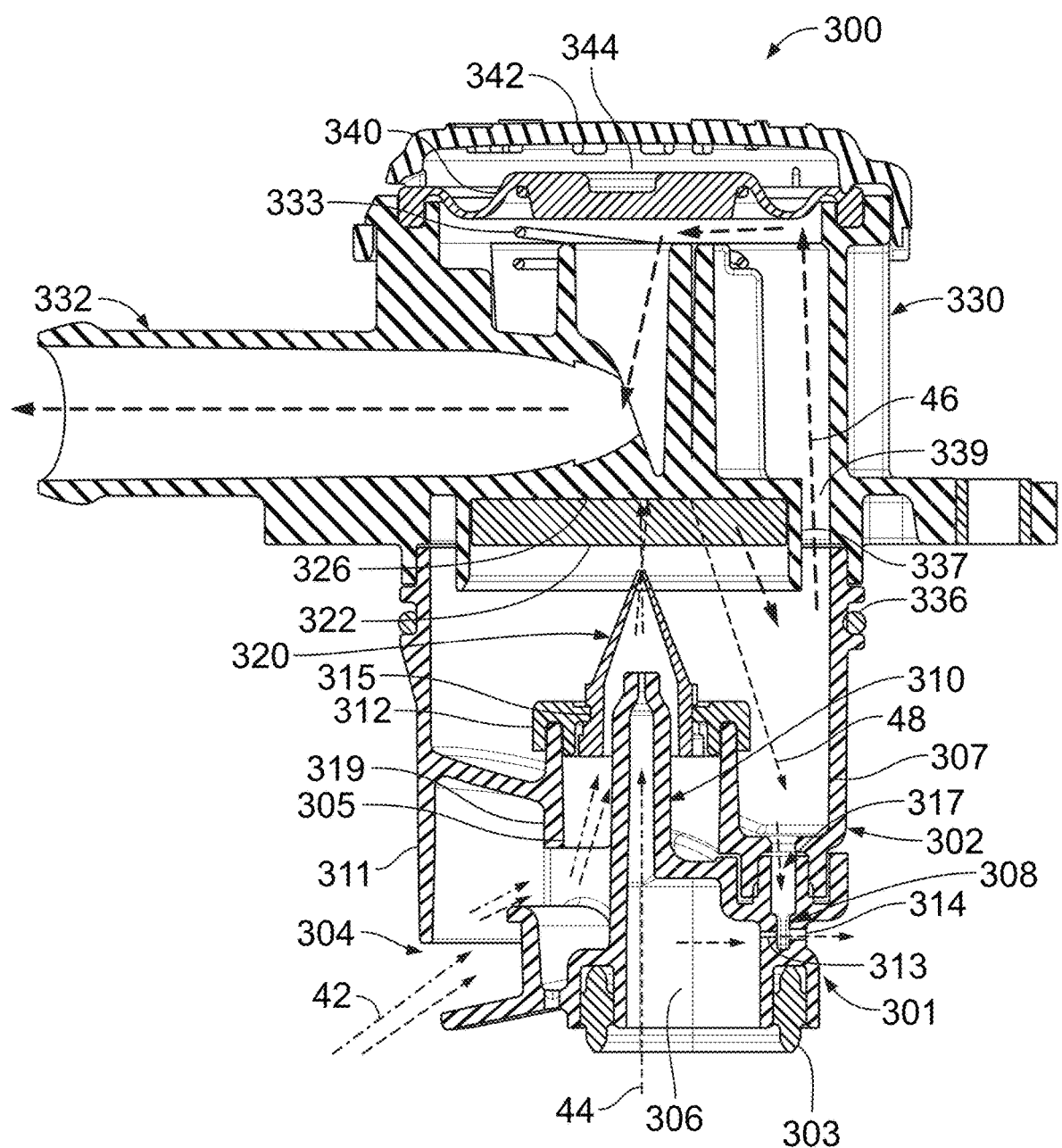
FIG. 7 is a side cross-section view of the gas-liquid separator of FIG. 4A taken along the line X-X in FIG. 4B.

A first end of the cover 330 may be coupled to the housing 302 (e.g., via securing members 334 such as screws, nuts, bolts, rivets, etc.). A seal member 336 may be disposed between the housing 302 and the cover 330 so as to form a radial and/or axial seal therebetween. The lid 342 is coupled to a second end of the cover 330 opposite the first end of the cover 330. The diaphragm 340 (e.g., a crankcase depression regulation diaphragm) is secured between the lid 342 and the second end of the cover 330 such that a space 344 (as shown in FIG. 7) is formed between the lid 342 and the diaphragm 340. A biasing member 333 (e.g., a spring) may be positioned between the diaphragm 340 and the cover 330.

The housing 302 defines a set of openings 305 structured to receive a corresponding outlet tube 310 formed in the baffle 301. The housing 302 includes a flange 311 extending axially towards the baffle 301 from an outer peripheral edge of the housing 302 such that when the baffle 301 is coupled to the housing 302, the flange 311 extends into, is positioned adjacent to, or extends circumferentially around a corresponding portion of the baffle 301 such that a first inlet 304 is formed between the flange 311 and the corresponding portion of the baffle 301 (e.g., an outer surface of the baffle 301). The first inlet 304 is configured to receive unfiltered blowby gases 42 and communicate the blowby gas 42 into the internal volume or area of the housing 302. The blowby gas stream 42 has a first flow velocity.

The upstream entry portion of the first inlet 304 is defined by an inner surface of the flange 311 of the housing 302 and an outer surface of the baffle 301. The first inlet 304 includes a body portion 319 that is positioned along a downstream, exit portion of the first inlet 304 and defines a downstream portion of the flow path through the first inlet 304 and extends into the internal area of the housing 302. The body portion 319 is an internal structure of the housing 302 that is configured to receive the outlet tube 310 of the baffle 301. The inner surface of the body portion 319 defines the opening 305.

As shown in FIG. 7, the first inlet 304 further includes a mounting plate 312 that is positioned along and coupled to a downstream or outlet end of the body portion 319 of the first inlet 304 (i.e., between an internal area of the first inlet 304 and the internal area of the housing 302 along the fluid flow path of the blowby gas stream 42). The mounting plate 312 is configured to secure the at least one elastomeric nozzle 320 (as described further herein) to the body portion 319 of the first inlet 304. In other embodiments, the mounting plate 312 may be excluded or integrated in the baffle 301 based on the geometry of the housing 302 and/or the baffle 301.

Figure 8:
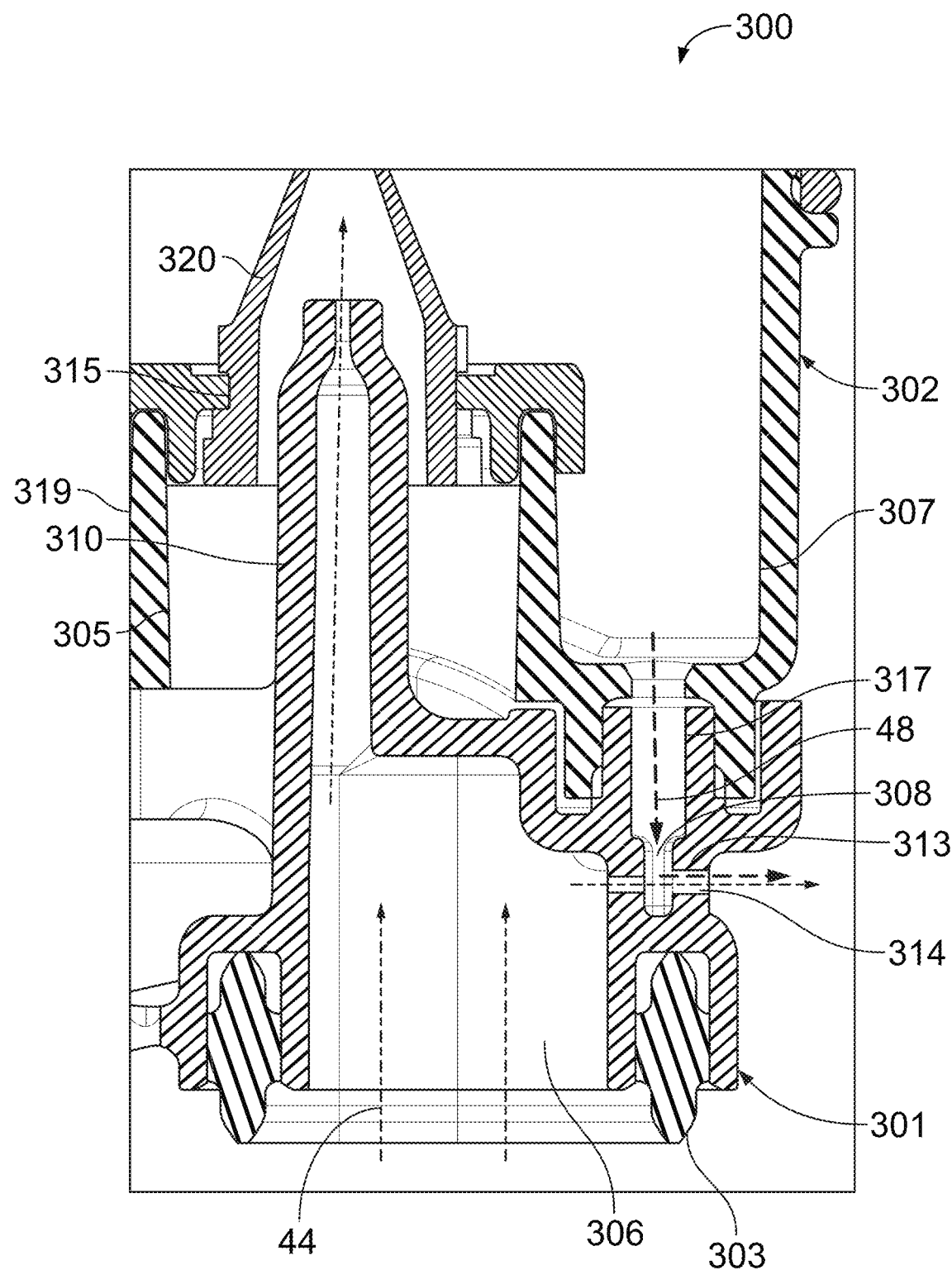
FIG. 8 is a side cross-sectional view of a portion of FIG. 7.

The mounting plate 312 defines through-holes 315 that correspond to each of the elastomeric nozzles 320. As shown in FIGS. 7-8, the elastomeric nozzles 320 each extend through one of the through-holes 315 to secure to the mounting plate 312, extending between an inner area of the first inlet 304 and the internal area of the housing 302. The outlet tubes 310 of the baffle 301 (as described further herein) may optionally extend at least partially through the through-holes 315 (thus allowing the mounting plate 312 to extend around a portion of the second inlet 306).

The baffle 301 defines a second inlet 306 structured to receive a compressed gas 44 such that the compressed gas 44 flows into the baffle 301 through the second inlet 306. The second inlet 306 may be disposed at a non-zero angle with respective the first inlet 304 (e.g., at an angle of about 90 degrees with respect to the first inlet 304). A second inlet seal member 303 is disposed at the upstream end of the second inlet 306 and configured to seal the second inlet 306 to a compressed gas source or any conduit coupling the second inlet 306 to the compressed gas source.

The outlet tubes 310 extend from a surface of the baffle 301 that is opposite the second inlet 306 and extend into the internal area of the housing 302 through the openings 305 and the body portion 319 of the first inlet 304 such that at least a portion of the outlet tubes 310 is disposed within and circumferentially surrounded by the body portion 319 of the first inlet 304 within the openings 305. The outer surface of the outlet tubes 310 is radially spaced apart from the inner surface of the body portion 319 of the first inlet 304 such that a radial gap is present between an inner surface of the body portion 319 of the first inlet 304 and an outer surface of the corresponding outlet tube 310 disposed therethrough. The blowby gases 42 can flow within the radial gap.

The second inlet 306 is structured to receive the compressed gas 44 and communicate the compressed gas 44 (e.g., compressed air) into the at least one outlet tube 310. The compressed gas 44 flows out from within the baffle 301 through the outlet tubes 310 and into the elastomeric nozzle 320 to combine with the blowby gas stream 42 within the elastomeric nozzle 320. The compressed gas 44 and the blowby gas stream 42 then flow together out from the elastomeric nozzle 320 into the internal area of the housing 302. The inner diameter or flow area of the outlet tubes 310 is smaller than (and downstream of) the inner diameter or flow area of the second inlet 306, where the flow area refers to the cross-sectional area taken along a plane approximately perpendicular to the flow path. The outlet tubes 310 thereby function as a motive jet and accelerate the compressed gas 44 into the elastomeric nozzle 320 (and subsequently into the internal area of the housing 302) to accelerate the blowby gas 42. While shown as including the outlet tubes 310, the baffle 301 may include any other opening or structure to allow the compressed gas 44 to enter the internal area of the housing 302.

The gas-liquid separator 300 further includes a set of the elastomeric nozzles 320 that is coupled to a downstream end of the first inlet 304 (i.e., to the mounting plate 312) and positioned around at least a portion of the baffle 301 (in particular around at least a portion of the outlet tubes 310). The elastomeric nozzle 320 is configured to combine the blowby gas 42 and the compressed gas 44 and communicate the combination downstream of the first inlet 304, into the internal area of the housing 302. One elastomeric nozzle 320 can be disposed around a corresponding one of the outlet tubes 310. Optionally, an elastomeric nozzle 120 can be positioned around each of the outlet tubes 110. The elastomeric nozzles 320 may have a duck billed shape or a conical shape.

The elastomeric nozzle 320 is positioned along the fluid flow path (of both the blowby gas stream 42 and the compressed gas 44) between the first inlet 304 and the baffle 301 (respectively) and the internal area of the housing 302. The elastomeric nozzles 320 may be mounted on or fluidly coupled to the mounting plate 312 of the first inlet 304 and positioned along the downstream end of the first inlet 304. Accordingly, the elastomeric nozzle 320 is disposed around a corresponding outlet tube 310 of the baffle 301. The inner surface of the elastomeric nozzle 320 is radially spaced apart from the outer surface of the outlet tube 310 to form a radial gap is between the outer surface of the corresponding outlet tube 310 and the inner surface of the respective elastomeric nozzles 320 (FIG. 7) through which the blowby gas 42 can flow into and through the elastomeric nozzle 320.

The downstream end of the outlet tube 310 is positioned within the elastomeric nozzle 320 such that the compressed gas 44 is output from the baffle 301 within the elastomeric nozzle 320. Accordingly, the elastomeric nozzle 320 is structured to receive both the blowby gas stream 42 and the compressed gas 44 and combine the blowby gas stream 42 with the compressed gas 44. Since the compressed gas 44 is flowing at a higher velocity than the blowby gas stream 42, the compressed gas 44 causes the blowby gas stream 42 to flow at a second flow velocity greater than the first flow velocity (i.e., the compressed gas 44 increases the flow velocity of the blowby gas 42). The compressed gas stream 44 also generates a pumping effect that reduces pressure drop throughout the gas-liquid separator 300.

As shown in FIG. 7, the cover 330 includes an impaction plate 326 (FIG. 7) that is disposed downstream of, and over the elastomeric nozzles 320. Accordingly, the blowby gas stream 42 (which has been combined with the compressed gas 44) exiting from the elastomeric nozzle 320 impacts the impaction plate 326, which separates the blowby gas stream 42 into cleaned blowby gas 46 and separated fluid 48 that was previously contained in the blowby gas stream 42. The impaction plate 326 may be formed by a flat surface of the cover 330 that is disposed downstream of and over the elastomeric nozzle 320 (e.g., in a direct flow path of the blowby gas 42 and compressed gas 44 flow streams flowing from the elastomeric nozzles 320). The flat surface forming the impaction plate 326 (that the blowby gas stream 42 impacts) extends along a plane that is at an angle of about 90 degrees with respect to a direction of flow of the blowby gas stream 42 and compressed gas 44 flow stream flowing out from the elastomeric nozzle 320.

An impaction plate flange 337 extends from the outer peripheral edges of the impaction plate 326 (as a part of the cover 330) towards the housing 302 such that a cover inlet 339 of the cover 330 is formed between an inside surface of an outer wall of the cover 330 and a portion (i.e., the outside surface) of the impaction plate flange 337. The impaction plate flange 337 extends circumferentially around the impaction plate 326 and extends axially from the impaction plate 326 in a direction opposite the fluid flow direction of the blowby gas 42 from the elastomeric nozzle 320. The impaction plate flange 337 may extend into the interior area of the housing 302 when assembled.

As shown in FIG. 7, the blowby gases 42 accelerated by the compressed gas 44 impact the impaction plate 326 causing separation of fluid 48 from the blowby gas 42, and creating the substantially oil free, cleaned blowby gas 46 (e.g., greater than 90% oil initially entrained in the blowby gas 42 being removed after impacting the impaction plate 326). The cleaned blowby gas 46 flows back into and flows through the internal area of the housing 302, around the elastomeric nozzle 320, then around the impaction plate flange 337, into and through the cover 330 (via the cover inlet 339), into an internal volume or area of the cover 330, through a cover outlet 332 (e.g., a gas outlet) that is defined in the cover 330, and out of the gas-liquid separator 300 (via the cover outlet 332).

In some embodiments, the gas-liquid separator 300 further includes a filter media 322 (e.g., a patch of filter media) disposed on the impaction plate 326 (between the outlet of the elastomeric nozzle 320 and the impaction plate 326 along the fluid flow path). The combined blowby gas 42 and compressed gas 44 stream impacts the filter media 322 such that the filter media 322 filters the blowby gas 42 prior to impacting the impaction plate 326.

As shown in FIGS. 7-8, the housing 302 defines a housing drain sump 307 in a base of the housing 302 and the baffle 301 defines a baffle drain sump 317 (downstream of the housing drain sump 307) where separated fluid 48 separated from blowby gases 42 collect. The baffle 301 further defines a drain 308 (e.g., an oil drain) at the base of the baffle drain sump 317 (downstream of the housing drain sump 307 and the baffle drain sump 317). The collected and separated fluid 48 (that has collected in the housing drain sump 307 in the base of the housing 302) flows through and drain from the housing drain sump 307 and subsequently the baffle drain sump 317 through the drain 308 (and thus from the gas-liquid separator 300). The inner diameter of the drain 308 is smaller than the inner diameters of the baffle drain sump 317 and the housing drain sump 307 (where the inner diameter of the baffle drain sump 317 is smaller than the inner diameter of the housing drain sump 307).

In some embodiments, a through-hole or aperture 313 (as shown in FIGS. 7-8) may be defined in the baffle 301 (e.g., extending through a sidewall of the baffle 301) proximate to the second inlet 306 and optionally fluidly coupled to the second inlet 306. The aperture 313 fluidly connects the second inlet 306, a downstream portion of the drain 308, and an outlet 314 of the baffle 301 (and of the entire gas-liquid separator 300). The inner diameter and flow area of the aperture 313 is smaller than the inner diameters (and flow areas) of the second inlet 306 and the outlet tube 310, where the flow area refers to the cross-sectional area taken along a plane approximately perpendicular to the flow path.

The aperture 313 may extend (along its axis and defined flow path) at approximately 90° relative to the axis of (and defined flow path of) the drain 308. FIG. 8 shows the path of the second portion of the compressed gas 44 through the aperture 313.

With the aperture 313, a first (larger) portion of the compressed gas 44 from the second inlet 306 flows into the outlet tube 310 (to accelerate the blowby gas 42 toward the impaction plate 326, as described further herein) and a second (smaller) portion of the compressed gas flows into the aperture 313 (to accelerate the separated fluid 48 through the drain 308). The aperture 313 is fluidly coupled to the drain 308 such that the second portion of the compressed gas 44 flowing out of the baffle 301 through the aperture 313 serves as a jet pump propelling the separated fluid 48 (e.g., the oil from the blowby gas 42) collected in the housing drain sump 307 and the baffle drain sump 317 out of the drain 308 and out of the aperture 313 (and thus out from the entire gas-liquid separator 300). It should be appreciated that the same compressed gas 44 (from the second inlet 306) flows to the outlet tube 310 and to the aperture 313, thereby providing a dual jet pump function.

Figure 9:
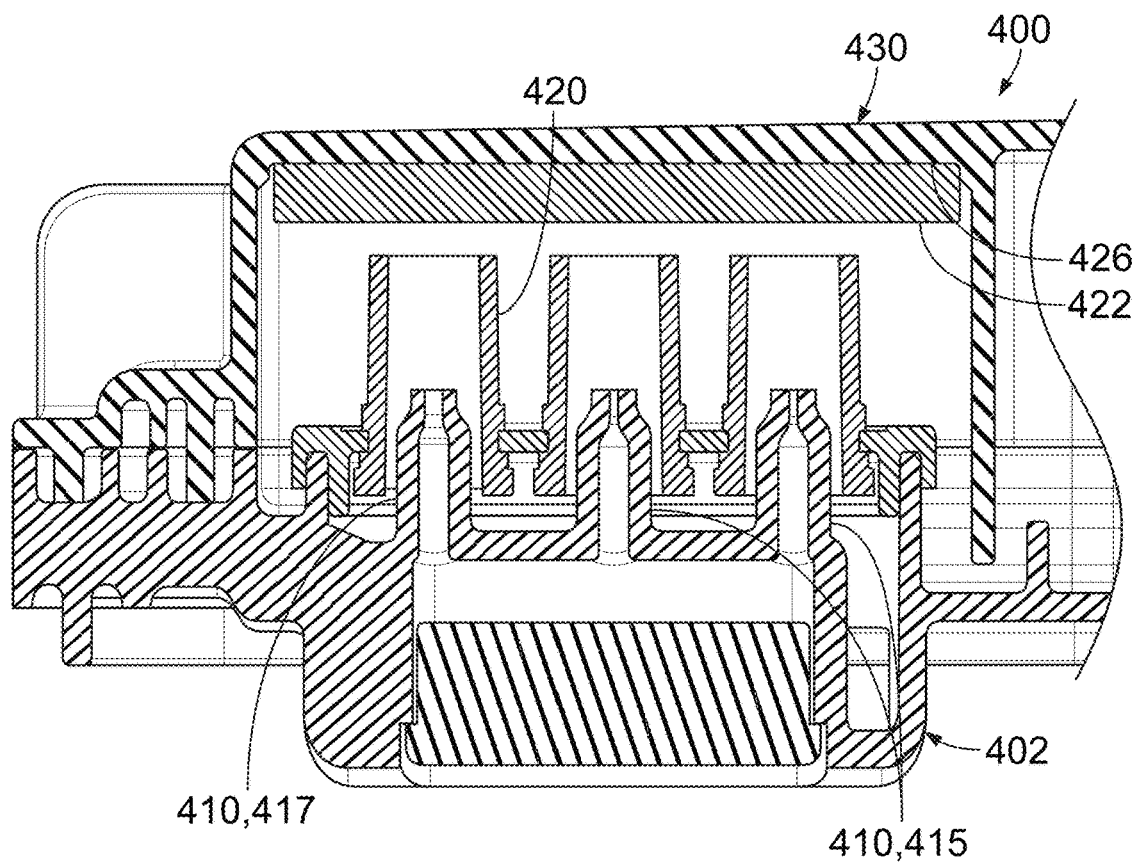
FIG. 9 is a side cross-sectional view of a gas-liquid separator, according to an embodiment.
Figure 10:
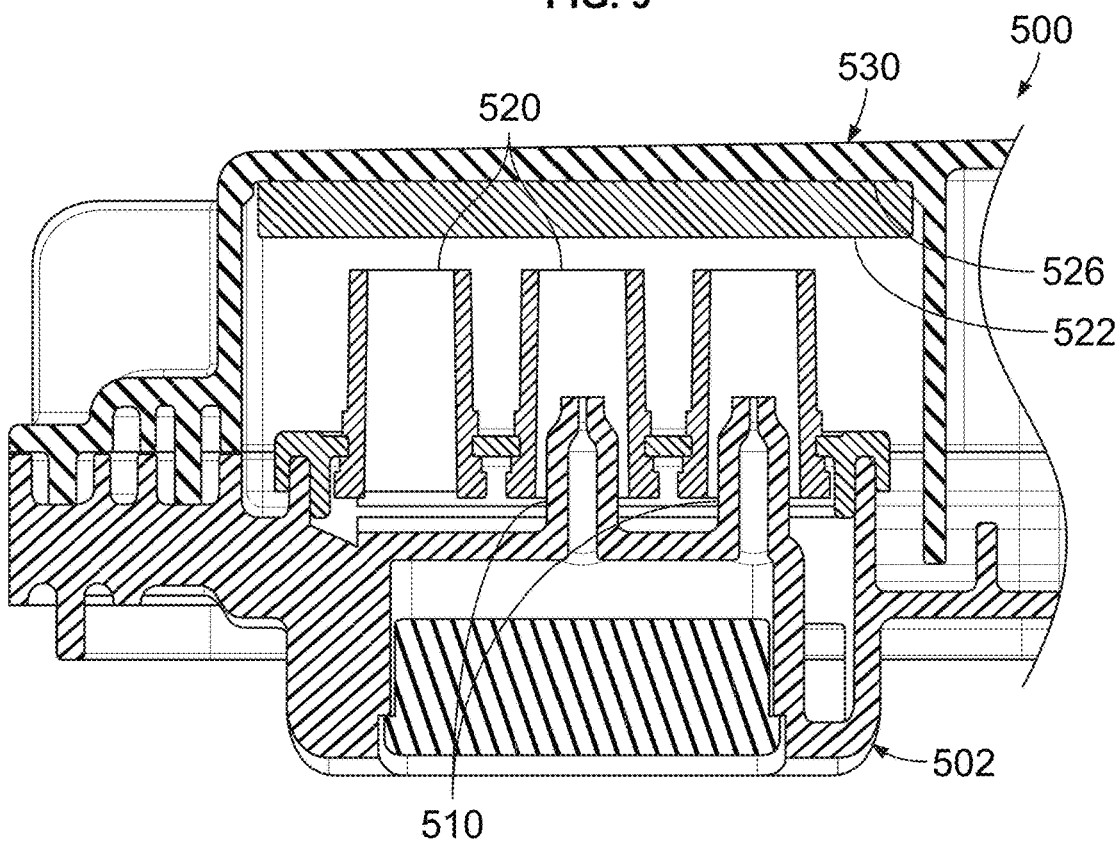
FIG. 10 is a side cross-sectional view of a gas-liquid separator, according to another embodiment.

FIGS. 9-10 show two embodiments of configurations of outlet tubes and elastomeric nozzles that may be integrated and used within any of the gas-liquid separators disclosed herein to utilize variable jet-assisted duckbill impactor technology. FIG. 9 shows an embodiment of a gas-liquid separator 400 that includes a housing 402 and a cover 430. The housing 402 includes a plurality of outlet tubes 410 that each direct fluid into an elastomeric nozzle 420. Each of the elastomeric nozzles 420 direct the fluid to a filter media 422 and an impaction plate 426 to separate fluid out from the blowby gas. Each of these components are described further herein in each of the various other embodiments.

Some or each of the outlet tubes 410 (or jet nozzles) may be a variety of different sizes (in particular along the inner diameter of the outlet tubes 410). For example, one or more of the outlet tubes 410 may be small outlet tubes 415 (with a relatively small inner diameter along the downstream end of the small outlet tube 415), and one or more of the outlet tubes 410 may be large outlet tubes 417 (with a relatively large inner diameter along the downstream end of the large outlet tube 417). Other outlet tubes 410 may have other size inner diameters, according to the desired configuration. By including both the small outlet tubes 415 and the large outlet tubes 417, the pressure drop can be fine-tuned for the best possible efficiency and the total flow through the gas-liquid separator 400 can be fine-tuned to mitigate carryover risks.

According to one embodiment, one of the outlet tubes 410 may be a small outlet tube 415 with an inner diameter of approximately 0.75 millimeters (mm), and another of the outlet tubes 410 may be a large outlet tube 417 with an inner diameter of approximately 1 mm.

Testing has shown that, in a range of sizes of outlet tubes 110 (i.e., 0.75 mm, 1 mm and 1.5 mm inner diameters), the large outlet tubes 417 have a higher pressure drop and a higher efficiency compared to the small outlet tubes 415. However, the pressure drop may exceed allowable limits. For the large outlet tubes 417 with a 1.5 mm inner diameter, at a given flow rate, the efficiency is boosted as high as 5%. For the smaller outlet tubes 415 (with a 0.75 mm or 1 mm inner diameter), the efficiency is boosted 0-2%.

Figure 11:
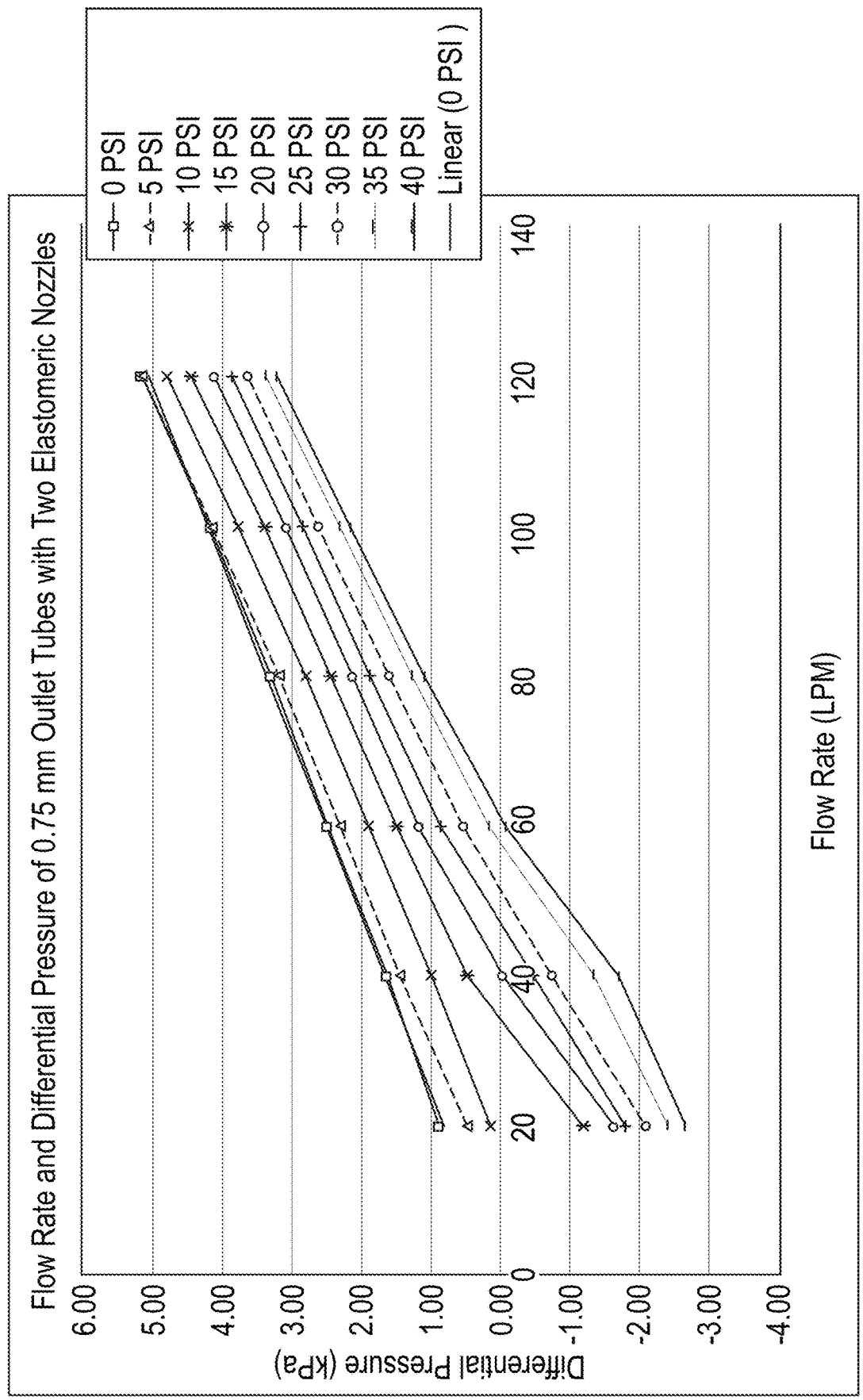
FIG. 11 is a graph of test results of how the differential pressure changes with the flow rate.

In particular, for the small outlet tubes 415 (with a 0.75 mm inner diameter), parasitic losses due to jet assist flow is 50% lower compared the large outlet tubes 417 (with a 1.5 mm inner diameter), with the same boost vacuum generated. The main benefit from the small outlet tubes 415 is a lower pressure drop (i.e., the pressure drop is not increased over the baseline (where the baseline is without any boost)), as the vacuum generated per unit flow through the small outlet tube 415 is greater with the same amount of air. However, as shown in FIG. 11, the efficiency is not improved with the small outlet tubes 415 compared to the large outlet tubes 417 since efficiency is mainly driven by increasing the velocity through the elastomeric nozzle 420. Accordingly, a lower boost flow (e.g., less than 2 cubic feet per minute (CFM) and 55 liters per minute (LPM)) provides a similar efficiency to the baseline (i.e. without any boost).

Figure 12:
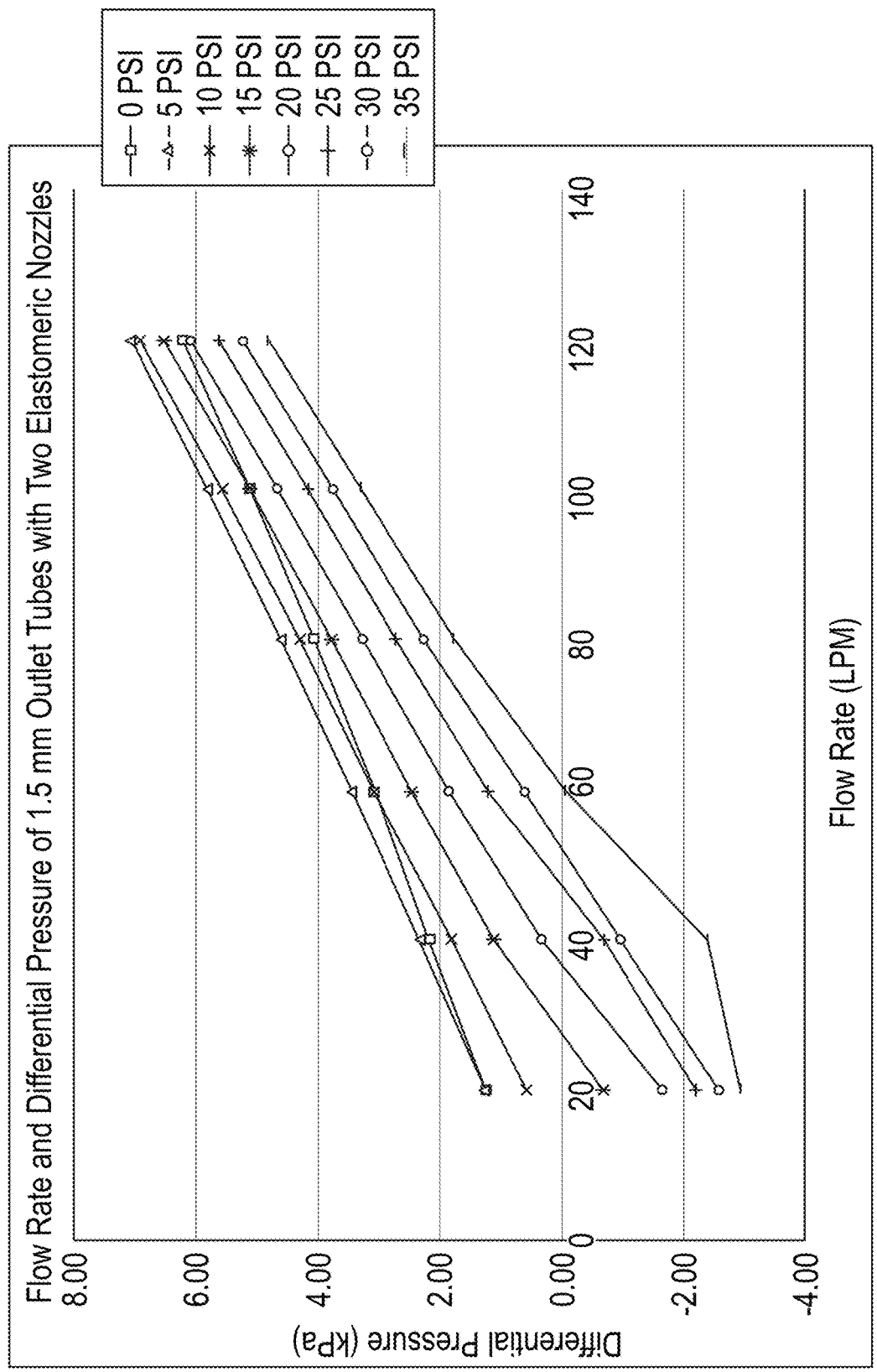
FIG. 12 is a graph of additional test results of how the differential pressure changes with the flow rate.

Benefits from the large outlet tubes 417 (compared to the small outlet tubes 415) include the increase in efficiency since efficiency is mainly driven by increasing the velocity through the elastomeric nozzle 420. Therefore, a higher boost flow (e.g., more than 3.53 CFM and 100 LPM) increases the efficiency compared to the baseline. The flow through the large outlet tubes 417 increases the velocity and increases the impaction efficiency. However, as shown in FIG. 12, the large outlet tubes 417 increases the pressure drop over the baseline (from no boost to 20 psi boosted condition) at rated flow. The benefit of the large outlet tubes 417 is greater at a higher boost flow.

The embodiments of FIGS. 9 and 10 (i.e., having outlet tubes 410 with different inner diameters and/or closing off some of the outlet tubes 510 such that one or more of the elastomeric nozzles 520 is not positioned over the outlet tubes 510) provide a number of different benefits. For example, these embodiments manage customer allowable inputs (such as the flow capability, the jet pressure, and the parasitic losses) when multiple nozzles are needed for a larger flow rate. By being able to boost specific elastomeric nozzles with a small outlet tube or a large outlet tube (or a combination) allows the gas-liquid separator to be conformed to the customer allowable inputs (e.g., the flow and pressure boost capacities), while using the maximum amount of boosted air per customer condition.

In one example, a gas-liquid separator may have nine elastomeric nozzles, some of which surround an outlet tube (i.e., are open) and some of which do not surround an outlet tube (i.e., are closed). However, if each of the nine elastomeric nozzles surrounds an outlet tube and is open, there may be an increase of more than 180 LPM outlet flow rate, which could also give carryover issues in some designs. The manufacturing capability on an outlet tube that has an inner diameter of less than 1 mm has a greater risk of flashing over (compared to a larger outlet tube). Therefore, by using a configuration in which some of the elastomeric nozzles are closed (and other area open), outlet tubes with a larger inner diameter can be used in manufacturing.

FIG. 10 shows an embodiment of a gas-liquid separator 500 that includes a housing 502 and a cover 530. The housing 502 includes at least one outlet tube 510 that directs fluid into an elastomeric nozzle 520. The elastomeric nozzle 520 directs the fluid to a filter media 522 and an impaction plate 526 to separate fluid out from the blowby gas. Each of these components are described further herein in each of the various other embodiments.

According to the embodiment of FIG. 10, the gas-liquid separator 500 includes a plurality of elastomeric nozzles 520. However, at least one of the elastomeric nozzles 520 is positioned over and around one of the outlet tubes 510 (thereby utilizing jet-assisted duckbill impactor technology), and at least one of the elastomeric nozzles 520 is not positioned over or around one of the outlet tubes 510 or the corresponding outlet tube 510 is completely closed (thereby utilizing duckbill impactor technology, without being jet-assisted). This configuration may be particularly beneficial when only slight efficiency boosts are needed and allowable power consumption is limited.

By not having the outlet tubes 510 for every elastomeric nozzle 520, the total flow through the gas-liquid separator 500 can be fine-tuned to mitigate carryover risks. Additionally, the configuration of FIG. 10 may be beneficial in scenarios in which where the outlet tube 110 cannot be manufactured with a smaller diameter, but parasitic losses still need to be managed. Additionally, the configuration of FIG. 10 (in which the number of outlet tubes is reduced rather than decreasing the size of the outlet tubes) avoids any performance decrease as a result of decreasing the size of the outlet tube.

The below table provides an example of various measurements when five outlet tubes 510 (and thus five elastomeric nozzles 520) are open compared to when only three outlet tubes 510 (and thus three elastomeric nozzle 520) are open. An embodiment in which three outlet tubes are open has approximately the same efficiency, a lower pressure drop, and a lower power consumption compared to an embodiment in which five outlet tubes are open.

|  | 5 outlet tubes open (0 outlet tubes blocked) | 3 outlet tubes open (2 outlet tubes blocked) |
| --- | --- | --- |
| Inner diameter of outlet tubes (mm) | 1.5 | 1.5 |
| Pressure (psi) | 25 | 30 |
| Flow (CFM) | 3.32 | 3.22 |
| Flow (LPM) | 93.956 | 91.126 |
| Vacuum Stall (" water) | −4.04 | −18.22 |
| Vacuum Stall (kPa) | −1.01 | −4.555 |
| Baseline | 90.42 | 90.42 |
| Separation Efficiency Percentage | 94.44% | 94.56% |

The gas-liquid separators 100, 200, 300, 400, and 500 each can have any of the features, components, and configurations of each other, except where noted otherwise.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A gas-liquid separator comprising:
   a housing comprising a flange extending from a portion of the housing;
   a baffle coupled to the housing such that a first inlet is defined between the flange and a portion of the baffle, the first inlet structured to receive a blowby gas stream, the blowby gas stream having a first flow velocity, the baffle comprising:
      a second inlet structured to receive a compressed gas, and
      at least one outlet tube disposed opposite the second inlet and extending axially into the housing, the at least one outlet tube structured to communicate the compressed gas into the housing;
   at least one elastomeric nozzle fluidly coupled to the first inlet and positioned around at least a portion of a corresponding outlet tube, the at least one elastomeric nozzle structured to combine the blowby gas stream with the compressed gas such that the compressed gas causes the blowby gas stream to flow at a second flow velocity greater than the first flow velocity; and an impaction plate disposed downstream of the elastomeric nozzle such that the blowby gas stream impacts the impaction plate and separates liquid and aerosol contained in the blowby gas stream.

2. The gas-liquid separator of claim 1, wherein a flow area of the at least one outlet tube is smaller than a flow area of the second inlet to create a motive jet.

3. The gas-liquid separator of claim 1, further comprising a cover that couples to the housing, wherein the cover comprises a flat surface that forms the impaction plate.

4. The gas-liquid separator of claim 3, wherein the cover comprises an impaction plate flange that extends circumferentially around the impaction plate.

5. The gas-liquid separator of claim 4, wherein a cover inlet of the cover is formed between an inside surface of an outer wall of the cover and an outside surface of the impaction plate flange.

6. The gas-liquid separator of claim 1, wherein the baffle defines a drain through which the liquid and aerosol separated from the blowby gas stream and collected in the housing drains out from the gas-liquid separator.

7. The gas-liquid separator of claim 6, wherein the baffle defines an aperture fluidly coupled to the second inlet, the drain, and an outlet of the baffle.

8. The gas-liquid separator of claim 7, wherein a first portion of the compressed gas from the second inlet flows into the at least one outlet tube and a second portion of the compressed gas flows into the aperture to accelerate the liquid and aerosol through the drain.

\* \* \* \* \*